US006529118B1

(12) United States Patent
Hofmeester et al.

(10) Patent No.: US 6,529,118 B1
(45) Date of Patent: Mar. 4, 2003

(54) PAGING RECEIVER THAT DISPLAYS VISUAL SYMBOLS

(75) Inventors: Gerrit H. Hofmeester, Utrecht (NL); Johannes A. M. Kemp, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1347 days.

(21) Appl. No.: 08/927,903

(22) Filed: Sep. 10, 1997

Related U.S. Application Data

(63) Continuation of application No. 08/540,515, filed on Oct. 10, 1995, now abandoned.

(30) Foreign Application Priority Data

Oct. 11, 1994 (EP) .......................................... 942029455

(51) Int. Cl.[7] .................................................. H04B 1/38
(52) U.S. Cl. ...................................................... 340/7.56
(58) Field of Search ............................ 340/825.44, 995, 340/7.52, 7.56; 455/145, 154.1; 345/43, 48, 50, 193

(56) References Cited

U.S. PATENT DOCUMENTS

| | | | | | |
|---|---|---|---|---|---|
| 4,229,822 | A | * | 10/1980 | Bench | 375/376 |
| 4,277,786 | A | * | 7/1981 | Waldron | 345/43 |
| 4,704,003 | A | * | 11/1987 | Komaki | 349/58 |
| 4,713,808 | A | * | 12/1987 | Gaskill et al. | 340/825.44 |
| 4,716,404 | A | * | 12/1987 | Tabata et al. | 340/995 |
| 5,087,905 | A | | 2/1992 | Kuramatsu et al. | 340/311.1 |
| 5,273,475 | A | * | 12/1993 | Oshikawa | 445/24 |
| 5,297,247 | A | * | 3/1994 | Kan | 345/193 |
| 5,397,503 | A | * | 3/1995 | Yuase et al. | 252/299.01 |

FOREIGN PATENT DOCUMENTS

| | | |
|---|---|---|
| WO | 9103885 | 3/1991 |

* cited by examiner

*Primary Examiner*—Michael Horabik
(74) *Attorney, Agent, or Firm*—Jack D. Slobod

(57) ABSTRACT

On a paging receiver visual symbols are visually reproduced, relative to one another as in a two-dimensional scene, under the control of a message received.

7 Claims, 3 Drawing Sheets

PAGING RECEIVER THAT DISPLAYS VISUAL SYMBOLS

This is a continuation of application Ser. No. 08/540,515, filed Oct. 10, 1995 now abandoned.

BACKGROUND OF THE INVENTION

The invention relates to a paging receiver, comprising receiving means for receiving a message, selection means which are arranged to select symbols, in dependence on the message, from a predetermined set of symbols, and reproduction means for the visual reproduction of the selected symbols.

A paging receiver of this kind is known from U.S. Pat. No. 5,297,247. Paging receivers are intended for use in a system for dispatching short messages to individual receivers. The paging receiver is capable of visually reproducing a number of predetermined symbols, such as digits, on a display panel. The message determines which symbols are selected for reproduction.

The person sending the message transmits its contents to a central station preferably by telephone. If the contents of the message are formed by a row of digits, this row can be transferred by successively selecting a row of digits on the telephone. Verbal contents are usually transferred verbally to an operator who subsequently composes the message by means of an alphanumerical keyboard. This renders the transmission of non-numerical messages expensive and unattractive if very personal messages are concerned. In order to mitigate this drawback, use can be made of code books whereby special meanings can be assigned to series of digits. Information can thus be dispatched by telephone without intervention by an operator.

The use of a code book, however, is not handy and has restrictions.

Therefore, it is inter alia an object of the invention to provide a paging receiver capable of reproducing a message in such a manner that the users can more readily attach their own meaning thereto, even when short messages are used.

SUMMARY OF THE INVENTION

To achieve this, the paging receiver in accordance with the invention is characterized in that the reproduction means are arranged to reproduce visually at least a part of the symbols as pictograms in predetermined locations so as to be situated relative to one another as in a two-dimensional scene. Contrary to digit and/or letter sequences, pictograms arranged as in a scene may have mutually different dimensions and/or be arranged in a non-recurrent pattern of positions. By reproducing the message as a two-dimensional scene, the user is offered a higher degree of freedom of association so that it is easier to agree on and memorize individual meanings for messages.

Furthermore, it is possible to produce a family of paging receivers whose members deviate from one another in respect of the pictograms and/or the situation of these pictograms, so that upon reception of one and the same message different members of the family will reproduce different scenes. The user can then select a paging receiver which is suitable for a desired type of meaning.

The sender of the message can readily compose the message by referring to predetermined pictogram symbols. This is desirable notably for paging systems; for example, a scene can be described via a telephone dial or keyboard by making a small number of choices, which scene is subsequently dispatched to the paging receiver for reproduction. The number of pictogram symbols is then preferably less than ten, so that each visual symbol corresponds to an own key.

An embodiment of the paging receiver in accordance with the invention is characterized in that the reproduction means comprise a display panel, that each visual symbol of said part corresponds to a predetermined, unique own position on the display panel, regardless of the message, and that the reproduction means are arranged to display each selected visual symbol in its predetermined, unique own position. Because each symbol has its own position in the scene, it is not necessary to transmit position information; moreover, less information suffices to compose the message. Furthermore, in most positions it is then merely necessary to display one symbol or not. Therefore, specially shaped electrodes suffice for the display panel, the shapes of said electrodes corresponding to the pictogram symbols. The pictogram symbols can then also be reproduced on a curved part of the surface of the paging receiver, so that its construction may be more compact. Paging receivers having a facility for the visual display of arbitrary symbols (i.e. not only visual pictogram symbols as in a scene) can also be rendered more compact in this manner.

An embodiment of the paging receiver in accordance with the invention is characterized in that the selection means are arranged to detect a predetermined code in the message and to enable selection and reproduction of any one of the visual symbols exclusively upon detection of the code. Thus, the sender can optionally switch on the reproduction of the pictogram symbols in the scene by including the code in the message. If no pictogram symbols need be reproduced, no information for the selection of the pictogram symbols need then be included in the message.

An embodiment of the paging receiver in accordance with the invention is characterized in that the selection means are arranged to detect the presence of given digits in a series of digits in the message and to select, upon detection, respective visual symbols exclusively associated with said given digits. This offers a simple way of composing the scene for which the sender need remember only little.

An embodiment of the paging receiver in accordance with the invention is characterized in that the reproduction means are arranged to reproduce a row or column of digits and/or letters simultaneously with the visual symbols, and to reproduce therein a digit and/or letter in each reproduction position which is selectable in dependence on the message. Thus, the paging receiver can reproduce, together with the pictogram symbols, for example a telephone number offering supplementary information for the scene. The digits of the telephone number are reproduced in the usual manner, i.e. as digits in a row of positions in which an arbitrarily adjustable digit may be present in any position as opposed to the scene configuration of the visual pictogram symbols. In comparison with the digits and/or letters, the scene preferably occupies the major part of the surface of the display panel.

BRIEF DESCRIPTION OF THE DRAWINGS

These and further aspects of the invention, its embodiments and advantages will be described in detail hereinafter with reference to Figures. Therein.

DETAILED DESCRIPTION OF THE PREFERRED

Figure 1:
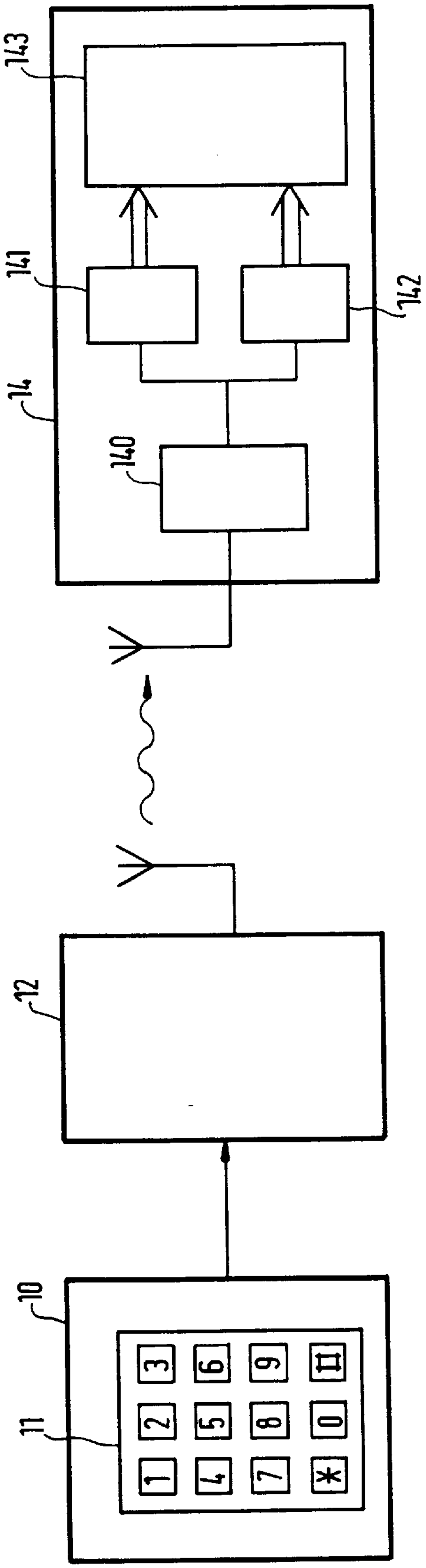
FIG. 1 shows a paging system.

FIG. 1 shows a paging system, comprising an input apparatus 10, a central transmitter 12 and a paging receiver 14. The paging receiver 14 comprises a receiving section 140 which is coupled to a first decoder 141 and a second decoder 142, said decoders themselves being coupled to reproduction means 143 including a display.

During normal operation, a sender contacts the central transmitter 12, for example via a telephone line and subsequently enters a series of digits by way of a keyboard 11 of the input apparatus 10, which digits indicate a specific paging receiver 14 and a specific contents of the message to be dispatched to the paging receiver 14. In response to the code, the central transmitter 12 transmits a message which contains an identification code of the intended paging receiver 14 and the meaningful contents. The receiving section 140 of the paging receiver 14 receives this message and checks whether the identification code in the message corresponds to an internal identification code.

If so, the message is stored in an internal memory (if desired, this memory can be arranged so that more than one message can be simultaneously stored therein so as to be fetched later); the arrival of the message is signalled to the person carrying the paging receiver, for example by way of a beep. When the person carrying the receiver activates the paging receiver, the receiving section transfers the meaningful contents to the decoders 141, 142; if desired, it is also possible to arrange the paging receiver so that it automatically transfers the meaningful contents, i.e. without activation of the receiver by the bearer.

The reproduction means 143 are capable of visually displaying different pictogram symbols from a set of pictogram symbols (to be referred to hereinafter only as symbols or visual symbols for the sake of brevity).

Figure 2:
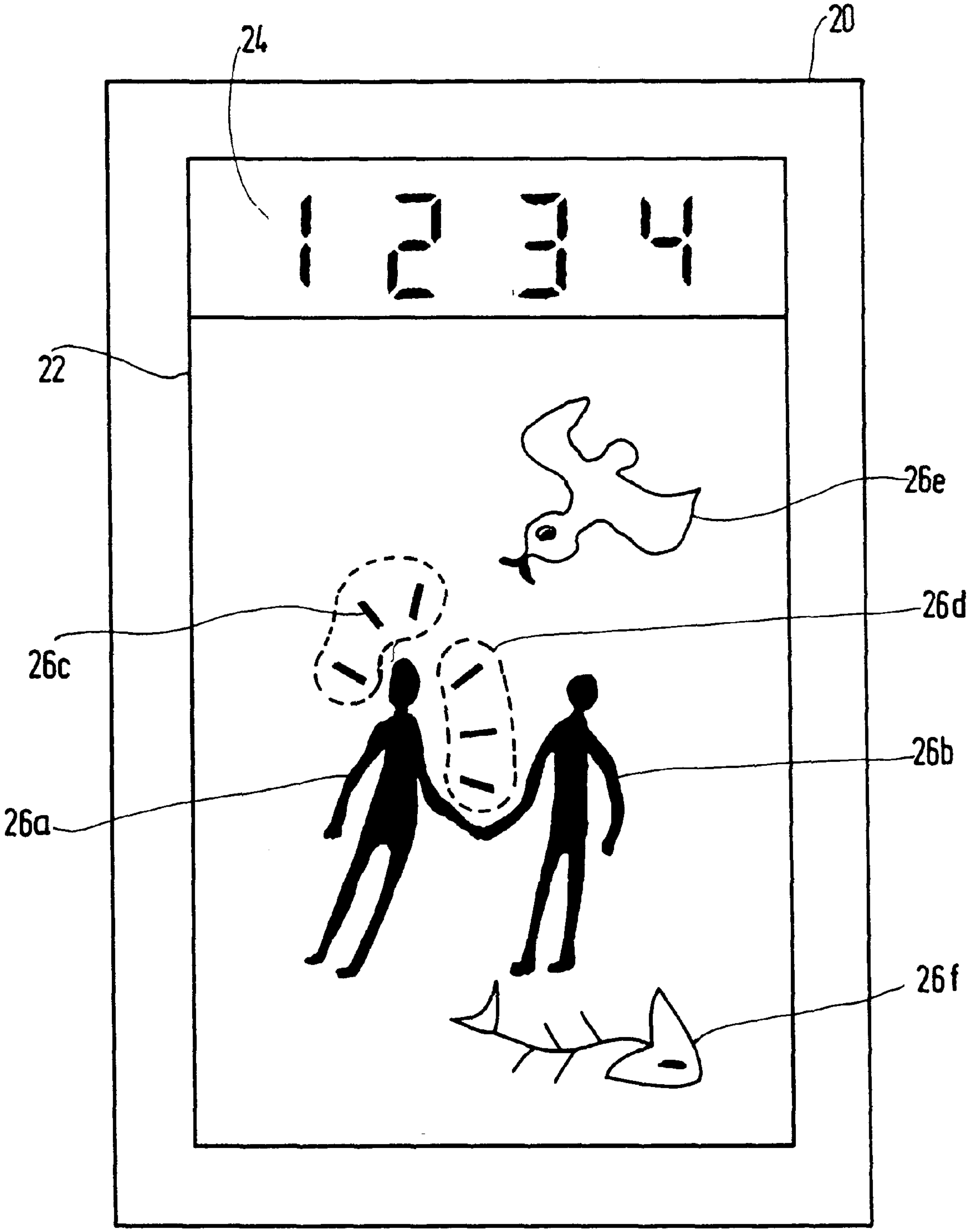
FIG. 2 shows a first paging receiver comprising a display panel.

FIG. 2 shows a paging receiver 20, comprising a display panel 22 which forms part of the reproduction means 143. A number of digits 24-1 . . . 5 and a number of visual symbols 26*a–f* are displayed on the display panel.

The first decoder 141 receives the meaningful contents of the message and on the basis thereof it determines which symbols of the set of visual symbols 26*a–f* are to be displayed and which symbols are not. This is executed on the basis of a series of digits or symbol associated codes entered by the sender via the keyboard 11. For example, a symbol is associated with each digit of the keyboard; for example, a 1 is associated with the visual symbol representing a human being, a 2 with a symbol representing a second human being standing besides the first human being, a 3 with a visual symbol representing a bird, etc. The first decoder 141 then determines, on the basis of the message, which digits have been entered via the keyboard 11 and supplies the reproduction means 143 with a control signal so as to display only the visual symbols associated with these digits. The visual symbols are not arranged in a row relative to one another, but are displayed in a scene. The positions in which the symbols are made visible relative to one another are predefined in the paging receiver, so that these positions need not be indicated in the message.

Because the visual symbols do not have a general, predetermined meaning and because the symbols are not arranged in a row but in a scene relative to one another, persons (senders-receivers) utilizing the system can readily attach own meanings to the reproduction of the symbols, it nevertheless being possible to enter the contents of the message by means of a small keyboard, such as a telephone keyboard, by depression of a small number of keys, and to dispatch the message via a standard numerical paging system.

The second decoder 142 decodes a part of the message other than the part decoded by the first decoder 141. From the message the second decoder determines a series of digits which have been successively entered via the keyboard 11, and supplies the reproduction means 143 with a control signal for reproducing these signals in a row in the sequence in which they have been entered. The function and the presence of the second decoder are not essential for the use of the paging receiver with the first decoder; however, it is advantageous to supplement the reproduction of the visual symbols by the simultaneous reproduction of digits, for example of a telephone number.

In order to enable the two decoders 141, 142 to distinguish the code of the visual symbols from the series of digits, for example, a decoder 141, 142 may be responsive to an opening symbol (for example, entering three digits “0” in direct succession via the keyboard 11), upon reception of which the first decoder 141 is activated and/or to a separation symbol (for example, entering a digit “0” via the keyboard 11) which separates the digits encoding the visual symbols whereto the first decoder responds from the row of digits decoded by the second decoder 142. Evidently, the two decoders 141, 142 may also be constructed as one decoder which has two functions and which is implemented mainly in a data processing unit (not shown) of the paging receiver 14 with appropriate software.

Figure 3:
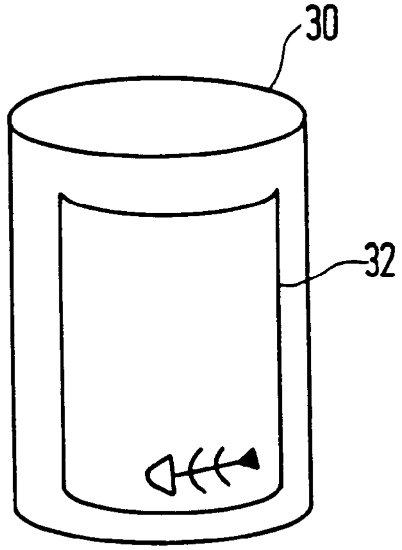
FIG. 3 shows a second paging receiver comprising a display panel.

FIG. 3 shows a paging receiver 30 having a cylindrically shaped exterior with a display panel 32 which follows the curvature of the exterior. The exterior of the receiver 30 is thus more effectively used for the panel. For a given surface area of the display panel a smaller and hence better portable receiver thus suffices. For the display panel use can be made of, for example a liquid crystal display whose electrodes are provided on a flexible foil.

Figure 4:
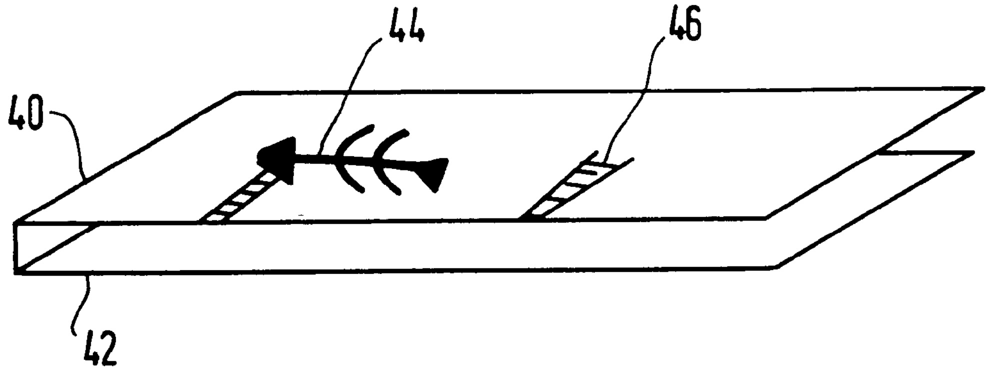
FIG. 4 shows a display panel for a paging receiver.

FIG. 4 shows a display panel comprising two electrode layers 40, 42 wherebetween, for example a liquid crystal material is provided. On at least one of the electrode layers 40 there are arranged electrodes 44, 46, each of which has a shape and location corresponding to a respective symbol to be displayed. By defining the shape and location of the symbols used already in the display panel, the control of the display panel is simplified. If necessary, however, use can also be made of a raster display panel, each symbol then being composed of a number of raster points. To this end, information indicating which raster points must be activated for the display of a given visual symbol can be stored in a ROM (Read-Only Memory) in the paging receiver.

The symbols cannot only be displayed, but also reproduced by means of sound, for example by associating a respective sound signal of a given duration which each symbol; this sound signal is stored in advance in a memory in the paging receiver (or the paging receiver comprises sound-generating means for the respective sound signals). The sounds associated with the selected symbols are then successively reproduced. Alternatively, one or more basic sound signals can be used which can be reproduced by the receiver in a number of different versions (for example, always the same relative sequence of notes, but alternately fast/slow, with up-transposed pitch/normal, with/without vibrato, with flute/cello etc.). The paging receiver then selects one option as a version of the basic signal, in the same way as the selection of the visual symbols, and audibly reproduces the resultant sound signal. The transmitting person and the receiving person can again simply agree to attach their own meaning to the various alternative messages to be audibly reproduced.

The paging receiver can be conceived to reproduce the symbols either as sound or visually. The user can then select the mode of reproduction of the message (visual/audio), for example by means of a switch.

What is claimed is:

1. A handheld paging receiver comprising receiving means for receiving messages and detecting symbol associated codes contained in the messages, selection means for selecting symbols corresponding to the possible symbol associated codes in the messages from a predetermined set of at least three visual symbols and for conveying said message using different selections of said symbols, and reproduction means for visually reproducing as pictograms a plurality of the selected symbols corresponding to symbol associated codes in a received message, wherein the reproduction means are arranged to visually reproduce the symbols of the set of at least three visual symbols as respective different pictograms in predesignated positions such that each different pictogram has its own exclusive predesignated position and the pictograms are situated relative to one another so as to form a two-dimensional scene.

2. The paging receiver as claimed in claim 1, wherein the reproduction means are arranged to independently selectively display or not display each of said different pictograms at its own exclusive position.

3. The paging receiver as claimed in claim 2, wherein the reproduction means comprises a display panel which has for each of said pictograms, a different control electrode whose shape corresponds to that of the pictogram.

4. The paging receiver as claimed in claim 2, wherein the display panel is curved so as to correspond to a curved enclosure of the paging receiver, said pictograms being displayed at least partly on a curved part of the display panel.

5. A paging receiver as claimed in claim 1, wherein the possible symbol associated codes are digits in one to one correspondence with the symbols of the set, and the messages contain respective series of such digits.

6. The paging receiver as claimed in claim 1, wherein the reproduction means are arranged to reproduce a row or column of digits and/or letters simultaneously with the visual symbols, and to reproduce therein a digit and/or letter in each reproduction position which is selectable in dependence on the message.

7. The paging receiver as claimed in claim 6, wherein the reproduction means comprise a controllable display panel having a first sub-surface for the visual symbols and a second sub-surface for the row of digits and/or letters, the first sub-surface being larger than the second sub-surface.

* * * * *